US 011726466B2

(12) United States Patent
Leyx et al.

(10) Patent No.: US 11,726,466 B2
(45) Date of Patent: Aug. 15, 2023

(54) SAFETY DETECTOR AND SAFETY DETECTION SYSTEM INCLUDING SAID SAFETY DETECTOR

(71) Applicant: Schneider Electric Industries SAS, Rueil Malmaison (FR)

(72) Inventors: Patrick Leyx, Angoulême (FR); Christophe Deschamps, Saint Martin d'Hères (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 245 days.

(21) Appl. No.: 17/117,323

(22) Filed: Dec. 10, 2020

(65) Prior Publication Data

US 2021/0181731 A1  Jun. 17, 2021

(30) Foreign Application Priority Data

Dec. 12, 2019  (FR) ...................................... 1914257

(51) Int. Cl.
  *G05B 23/02*  (2006.01)
  *G05B 9/02*   (2006.01)
(52) U.S. Cl.
  CPC .......... *G05B 23/0216* (2013.01); *G05B 9/02* (2013.01); *G05B 23/0213* (2013.01)
(58) Field of Classification Search
  None
  See application file for complete search history.

(56) References Cited

U.S. PATENT DOCUMENTS

| 2004/0165525 | A1* | 8/2004 | Burak ..................... H04L 45/06 370/228 |
| 2006/0236189 | A1* | 10/2006 | Kato ................. H04L 12/40189 714/748 |
| 2008/0067877 | A1 | 3/2008 | Nitsche |
| 2012/0005748 | A1 | 1/2012 | Zondler et al. |
| 2013/0314231 | A1 | 11/2013 | Auger et al. |

FOREIGN PATENT DOCUMENTS

| DE | 102005014122 A1 | 9/2006 |
| DE | 102008060010 A1 | 6/2010 |
| EP | 2667266 A1 | 11/2013 |

OTHER PUBLICATIONS

Republique Francaise Institut National De La Propriete Industrielle, French Search Report and Opinion for French Patent Application No. FR1914257 dated Sep. 7, 2020, 8 pages.

* cited by examiner

*Primary Examiner* — Santosh R Poudel
(74) *Attorney, Agent, or Firm* — Locke Lord LLP (57) ABSTRACT

A safety detector including a detection module configured for reading a control signal at the input, the detector including two supply terminals, a first control input and a first control output, a first safety output and a second safety output, and a first free terminal and a second free terminal, the detector including:
  a second control input connected to the first free terminal and a second control output connected to the second free terminal, and
  a test module configured for notably applying a first test sequence including a disabling of the first control output and a test of a start loop connected between the second control output and the first control input.

18 Claims, 6 Drawing Sheets

SAFETY DETECTOR AND SAFETY DETECTION SYSTEM INCLUDING SAID SAFETY DETECTOR

TECHNICAL FIELD OF THE INVENTION

The present invention relates to a safety detector and to a safety detection system comprising said detector. The invention also relates to a control method implemented in said safety detector.

PRIOR ART

Various types of safety detector exist. It may for example take the form of a safety light barrier, of a safety switch with traction cable or of a safety detector referred to as contactless. The latter is a contactless device consisting of a sensor (also called "reader") controlled by microcontroller and of a transponder (also called "coded actuator").

A safety detector may comprise two redundant safety outputs (called OSSD outputs for "Output Signal Switching Device"). When these outputs are in the closed state, the application protected by the safety detector can operate. By way of example, in the case of a contactless safety detector, the sensor is installed on a fixed part of a protection device (for example, the frame of the door for accessing a hazardous area) of an installation to be protected, and the transponder on a mobile part of the protection device.

There is no contact between the transponder and the sensor. The use of radiofrequency technology (RFID) allows the communication between the sensor and the transponder. The sensor and the transponder have been previously paired, for example during the manufacture, and the sensor loads a unique code into the transponder with which it will be sold. The recorded numerical code is the unique "key" accepted by the paired sensor.

When the transponder enters into the radiofrequency field generated by the sensor, the sensor detects the transponder and reads the data in the memory of the transponder.

If the code from the transponder requested by the sensor is correct, the two redundant safety outputs from the sensor go into the closed state (hereinafter ON state), which means that the protection device of the installation is closed and that the machine can run.

If the transponder goes out of the field generated by the sensor (for example when the door of the hazardous area to be protected is opened), the two redundant safety outputs of the sensor go into the open state (hereinafter OFF state) in order to stop the machine.

Some of the safety detectors described hereinabove are furthermore designed to operate autonomously, in other words their two safety outputs are connected directly to contactors equipped with mechanical contacts, without any intermediate relay or programmable controller (PLC). The connection system available on the safety detectors is, generally speaking, a connector of the M12 type with eight pins.

Generally speaking, a safety detector can have two modes of operation available. Applied to a safety detector of the contactless type, these two modes of operation are as follows:

In a first mode of operation, referred to as automatic start, the sensor is in a state called RUN after starting without intervention of the operator, as long as the paired transponder is present in the detection area of the sensor. When it is turned on, the sensor thus goes through an initialization phase, during which its safety outputs are in the OFF state.

If no fault is detected and if the transponder is in the detection area of the sensor, the detector goes automatically into this RUN state and the two safety outputs go into the ON state. Subsequently, if the transponder goes out of the detection area of the sensor, the sensor goes from the RUN state into the STOP state and the two safety outputs are switched into the OFF state. It remains in this STOP state until the paired transponder again enters the detection area (without detecting a fault). In the latter case, the sensor subsequently goes automatically from the STOP state back into the RUN state and the two safety outputs can switch into the ON state.

In a second mode of operation, referred to as manual start, when turned on the sensor goes through an initialization phase, during which its safety outputs are in the OFF state. If no fault is detected after the auto-tests, it goes into the state called START/RESTART. In order to go into the RUN state and make its safety outputs go into the ON state, the paired transponder must be located in the detection area, with no fault detected, and the operator must actuate a start push-button and release it (monitored start).

If the transponder goes out of the detection area when the sensor is in the RUN state, the sensor goes automatically to the STOP state and its safety outputs go from the ON state to the OFF state. If the paired transponder goes back into the detection area (and if no fault is detected), the sensor goes back into the START/RESTART state and the safety outputs of the sensor remain in the OFF state until the push-button is actuated.

Safety detectors with autonomous operation comprise an external loop, referred to as EDM (for "External Device Monitoring") allowing it to be verified whether the switching devices such as the contactors are responding correctly to the safety outputs from the detector.

The loop of the EDM type monitors the external contactors connected to the two safety outputs of the detector. For this purpose, it monitors normally-closed (NC) contacts of these external contactors. If the external loop is not closed, the detector must not enable its safety outputs.

Today, it may be desirable to connect an emergency stop device to a safety detector of the autonomous type such as described hereinabove, in order to include an additional safety function therein. However, in its autonomous version, in other words without the use of a safety logic block, the addition of the emergency stop function may prove to be complex because the detector only comprises eight electrical terminals. Conventionally, the terminals of the detector are wired in the following manner:

- Two supply terminals are connected to a power supply;
- Two terminals for the safety outputs are each connected in a redundant manner to a contactor of the application;
- One or two terminals for the EDM monitoring function are connected to the external loop.

There thus remain only two or three terminals available. However, in order to connect an emergency stop device with two redundant contacts, four additional terminals are needed. In its conventional configuration, the detector is not therefore adapted to be associated with an emergency stop device, while at the same time conserving its current functionalities.

The aim of the invention is therefore to provide a safety detector designed to be associated with an emergency stop device, in a configuration with only eight connection terminals, and a solution allowing an emergency stop device to be associated with such a safety detector.

The solution of the invention notably offers an advantage when the safety detector is of the autonomous type, in other words comprising an integrated intelligence sufficient for directly controlling the contactors of the machine, without making use of a safety logic block.

DESCRIPTION OF THE INVENTION

This goal is achieved by a safety detector comprising a detection module configured for reading a control signal at the input, said detector comprising two supply terminals, a first control input and a first control output, a first safety output and a second safety output, and a first free terminal and a second free terminal, said detector also comprising:

A second control input connected to the first free terminal and a second control output connected to the second free terminal, A test module configured for applying a first test sequence comprising a disabling of the first control output and a test of a start loop connected between the second control output and the first control input and/or a second test sequence comprising a disabling of the second control output and a test of a start loop connected between the first control output and the second control input.

According to one particular embodiment, the test module is configured for carrying out a third test sequence comprising an enabling of the second control output and a read of the status of the second control input.

According to another particular embodiment, the test module is configured for carrying out a fourth test sequence comprising a read of the status of the first control output and of the status of the second control output.

According to another particular embodiment, the detector comprises a control and processing unit configured for running said test module.

According to another particular embodiment, the control and processing unit is configured for running:

A module for reading the status of each control input;
A module for determining an operational state taking into account the status of its control inputs;
One or more modules for controlling its safety outputs and its control outputs, according to the determined operational state.

According to one variant embodiment, the safety detector may be of the contactless type and comprises:

A sensor and a transponder paired to the sensor,
The control signal being modified when said transponder is present in a detection area of the sensor.

According to another variant embodiment, the safety detector may be of the light barrier type, the control signal being modified by passing through said light barrier.

According to another variant embodiment, the safety detector may be of the type using actuation by cable, the control signal being modified by traction of said cable.

The invention also relates to a safety detection system, comprising a safety detector such as defined hereinabove, an emergency stop device with two redundant contacts and a start loop, said system being characterized in that:

The start loop is connected between the first control output and the second control output of the safety detector;
A first redundant contact of the emergency stop device is connected between the first control input and the first control output and the second redundant contact of the emergency stop device is connected between the second control input and the second control output.

According to one particular embodiment, the start loop comprises a start push-button.

According to another particular embodiment, the start loop comprises two normally-closed contacts of two contactors for controlling an installation to be controlled.

The invention also relates to a control method implemented in a safety detector employed in a safety detection system such as defined hereinabove, said method comprising a first test sequence which comprises steps for:

Disabling the first control output of the detector;
Testing the status of the start loop by enabling the second control output and by reading the status of the first control input of the detector;
And/or a second test sequence which comprises steps for:
Disabling the second control output of the detector;
Test of the status of the start loop by enabling the first control output and by reading the status of the second control input of the detector.

According to one particular embodiment, the step of test is implemented several times for as long as the first control input has not been enabled during said first test sequence and/or for as long as the second control input has not been enabled during the second test sequence.

According to another particular embodiment, the method comprises a start step by enabling safety outputs and a step for re-enabling the first control output for the first test sequence.

According to another particular embodiment, the method comprises a start step by enabling safety outputs and a step for re-enabling the second control output for the second test sequence.

According to one particular embodiment, after said start step, the method comprises a step for monitoring the first redundant contact of the emergency stop device between the first control input and the first control output and for monitoring the second redundant contact of the emergency stop device between the second control input and the second control output.

The invention also relates to the use of the safety detection system such as defined hereinabove for monitoring the start of an electrical installation protected by a device comprising a fixed part onto which a sensor of the safety detector is fixed and a mobile part onto which a transponder of the safety detector is fixed.

BRIEF DESCRIPTION OF THE FIGURES

Other features and advantages will become apparent in the detailed description that follows presented with reference to the appended drawings, wherein.

DETAILED DESCRIPTION OF AT LEAST ONE EMBODIMENT

In the following part of the description, the OFF state is defined as the disabled or open state of an input or of an output of the safety detector and the ON state as the enabled or closed state of an input or of an output of the safety detector.

In a known manner, the ON state of an output or of an input is defined by the creation of a non-zero electrical potential on an electrical terminal associated with the output or with the input and the OFF state of an output or of an input is defined by an absence of electrical potential on the electrical terminal associated with the output or with the input.

In a known manner, an input or an output is formed by one or more transistors, the input being read by a control and processing unit and an output being controlled to open (OFF state) or to close (ON state) by a signal coming from the control and processing unit.

The status of each output may be indicated by an indicator lamp.

Figure 1A:
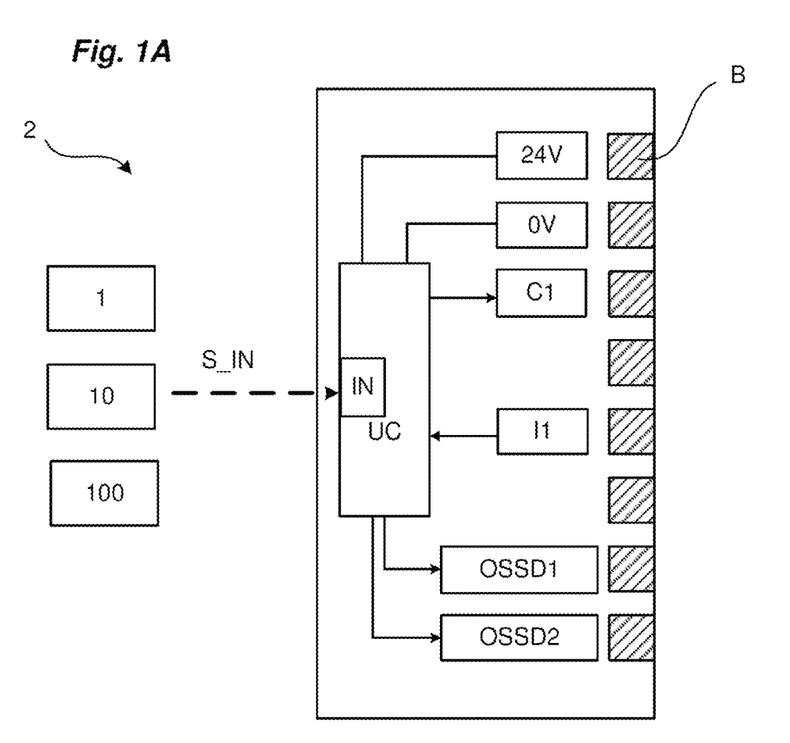
FIG. 1A shows schematically the architecture of a conventional safety detector and FIG. 1B shows schematically the architecture of a contactless safety detector having a sensor and a transponder.

With reference to FIG. 1A, generally speaking, a safety detector 2 comprises only eight electrical connection terminals which will be detailed hereinbelow.

The detector 2 conventionally comprises at least one module IN for detection of a control signal S_IN generated at the input. Depending on the type of detector, the control signal S_IN may be modified by actuating or releasing a cable 10, by cutting or otherwise the beam of a light barrier 100 or by the absence or the presence of a transponder 1 in a detection area of the sensor 2 when it is a contactless safety detector.

The detector 2 comprises two redundant safety outputs, referenced OSSD1 and OSSD2, available on two safety output terminals of the detector.

It comprises two electrical supply terminals (0V and 24V) designed to be connected to an external power supply and to which its internal circuits are connected in order to be supplied with electricity.

It comprises a control input I1 connected to a control input terminal and potentially a control output C1 available on a control output terminal.

The sensor comprises a processing and control unit UC comprising schematically:
 The module IN for detecting the control signal S_IN;
 A module for reading the status of the control input I1;
 A module for determining the operational state of the detector, taking into account the status of its inputs (signal S_IN and I1);
 A module for controlling the safety outputs OSSD1, OSSD2 and the control output C1, according to the determined operational state.

Figure 1B:
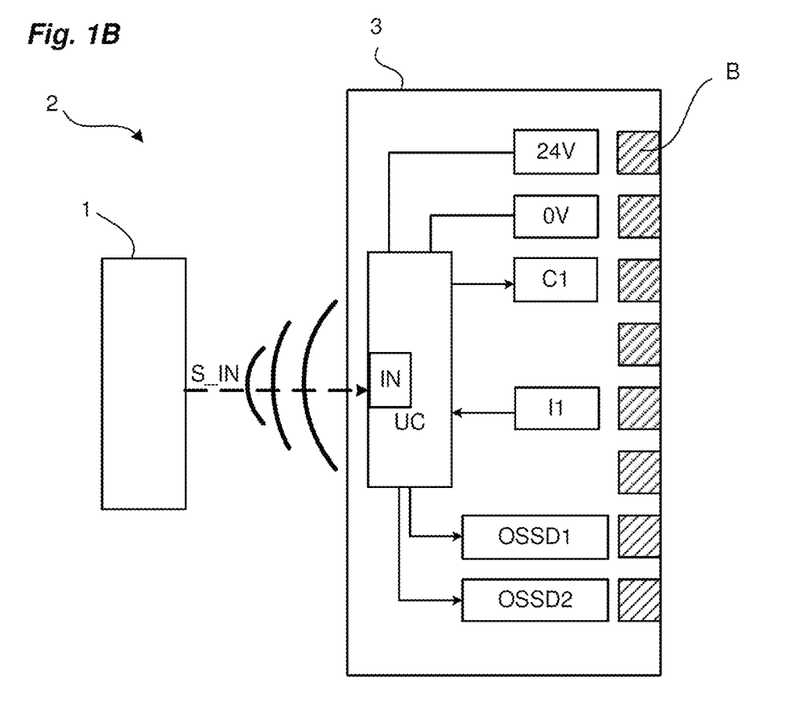
Figure 2A:
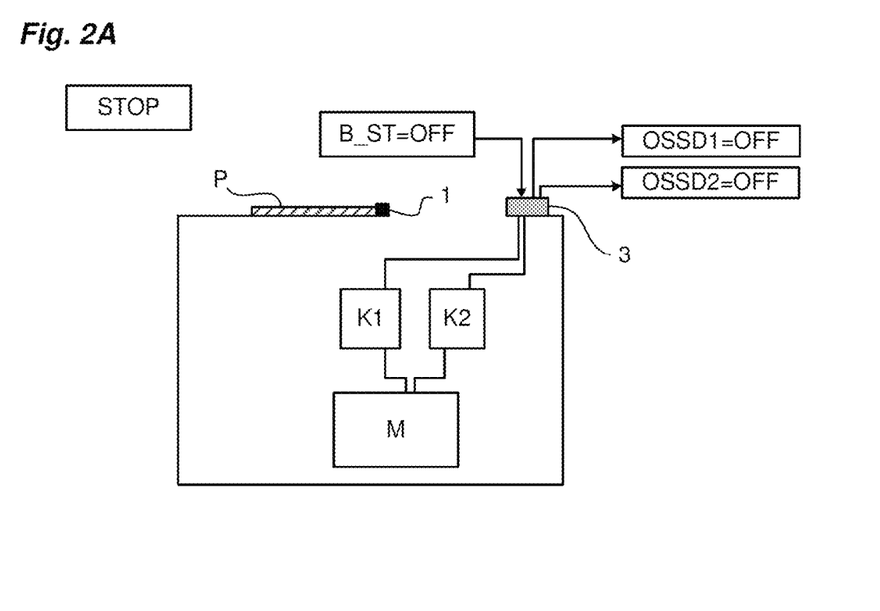
FIGS. 2A to 2C illustrate the principle of operation of a contactless safety detector employed in the protection of an installation.
Figure 2B:
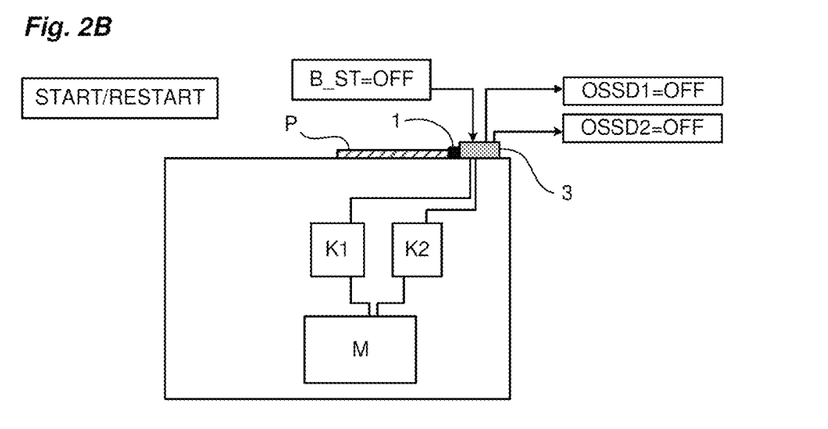
Figure 2C:
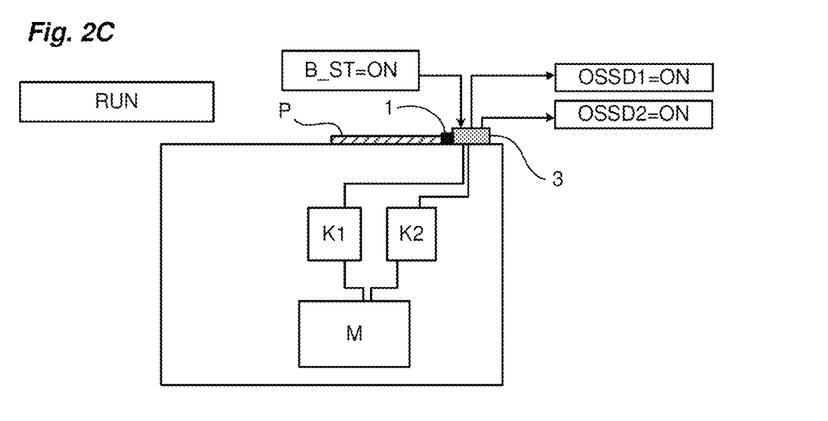

With reference to FIG. 1B, in the case of a safety detector of the contactless type, the detector comprises a sensor 3 and a transponder 1. The sensor 3 and the transponder 1 are fabricated in two separate and independent housings, in such a manner as to be fixable respectively onto a fixed part and onto a mobile part of a protection device (for example a means of access P to a dangerous machine M in FIGS. 2A to 2C). Such a detector operates by employing a contactless technology of the RFID ("Radio-Frequency Identification") type. The transponder 1 is assigned a unique code stored in its memory. The sensor 3 and the transponder 1 are paired. When the transponder 1, known by the sensor 3, is present in the detection area of the sensor 3, the control signal S_IN is modified. The detection module IN of the processing and control unit UC of the sensor 3 reads the code stored in the transponder 1.

In a non-limiting manner, the principle of the invention is described hereinbelow for a contactless safety detector, but it will readily be understood that it may be applied to all types of safety detectors, notably those already described hereinabove (light barrier, cable detector, etc.). Indeed, as the inventive features are mainly linked to the test module present in the detector and to the type of wiring of the detector, it will be understood that the control signal S_IN present at the input could be of any type.

As described hereinabove, the safety detector may have an automatic start or a monitored manual start. With automatic start, the detector comprises two modes of operation:
 RUN mode when the transponder 1 is present in the detection area of the sensor 3; the safety outputs are switched automatically to the ON state after start "auto-tests";
 STOP mode when the transponder 1 is no longer in the detection area of the sensor 3; the safety outputs are then switched to the OFF state.

With monitored manual start, the system comprises a start loop B_ST comprising a start button SW associated with the detector, which can take two distinct states, open (OFF) or closed (ON). The detector 2 thus comprises three modes of operation:
 STOP mode (FIG. 2A) when the transponder is no longer in the detection area of the sensor (device P open); the safety outputs are therefore switched to the OFF state;
 START/RESTART mode (FIG. 2B) when the transponder 1 is present in the detection area (device P closed) of the sensor 3 but the start loop remains open (button SW in the OFF state); the safety outputs are therefore in the OFF state;
 RUN mode (FIG. 2C) when the transponder 1 is present in the detection area of the sensor 3 (device P closed) and when the latter detects the closing of the start loop after the button SW goes to the ON state, then its release; the safety outputs are then switched to the ON state.

In the two configurations (automatic start or monitored manual), the detector 2 may comprise a fault detection module able to hold the outputs in the OFF state if the presence of a fault is detected. This module does not form part of the invention and is not therefore described in the present application.

It will be seen that the invention offers an advantage when the detector has a monitored manual start and hence when a read of the start loop B_ST is required.

Furthermore, as described hereinabove, the detector may have autonomous operation, in other words the contactors K1, K2 of the machine M to be controlled are directly connected to the safety outputs of the sensor, without going via a safety logic block. In other words, as soon as the safety outputs go to the ON state, the contactors controlling the machine are switched. Conventionally, the contactors K1, K2 are connected to the machine M in a redundant manner so as to ensure the shutdown of the machine M, even in the case of a malfunction of one of the two contactors.

The invention aims to provide a safety solution wherein an emergency stop device AU is associated with a safety detector. The invention consists notably in arranging for the detector to be able to manage itself this emergency stop functionality. The invention offers a particular advantage when the detector is of the autonomous type.

As a reminder, an emergency stop device AU is a device which notably comprises a control button and at least two redundant contacts AU_1, AU_2 of the NC (Normally-Closed) type. It is designed to be connected to a circuit of the installation. In the case of an anomaly, pressing the control button opens the two redundant contacts, allowing the electrical installation to be stopped. The redundancy is applied in order to detect any operational discrepancy.

Figure 3:
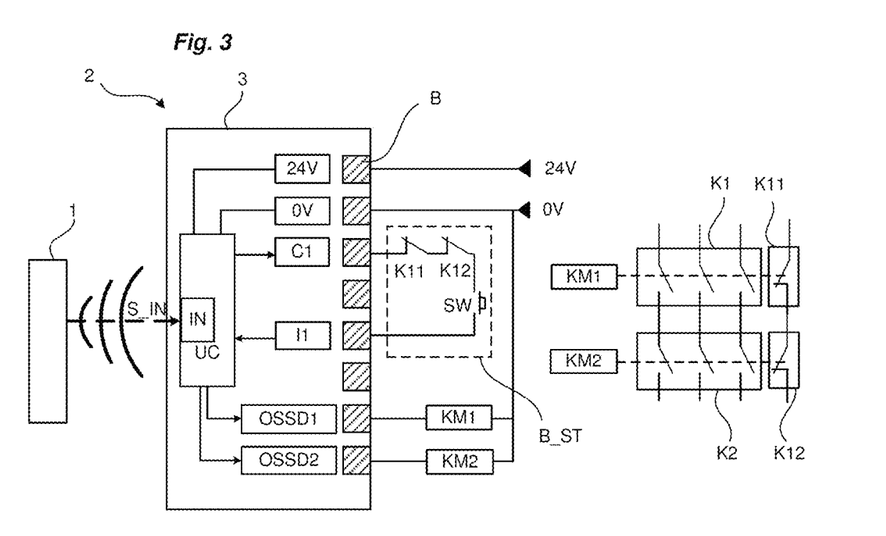
FIG. 3 shows a conventional architecture for wiring of the sensor of a contactless safety detector.

FIG. 3 shows the wiring of a safety detector 2 of the autonomous type, without an emergency stop device. In this FIG. 3, there are thus:
- The two supply terminals 0V, 24V connected to an external power source for applying a given voltage to it (here 24V);
- The two safety outputs, denoted OSSD1 and OSSD2 (for "Output Signal Switching Device") each connected via the two safety terminals to a contactor (control coils KM1, KM2 of each contactor K1, K2) of the machine M to be controlled;
- A first control input I1 and a first control output C1 connected together via a start loop B_ST comprising a start push-button SW and the normally-closed contacts K11, K12 of the two contactors.

As described hereinabove, in this scenario, the detector 2 only then comprises two free terminals B (in other words not connected to an input or an output of the detector), which is in theory insufficient to connect to them the two redundant contacts AU_1, AU_2 of the emergency stop device AU.

Figure 4:
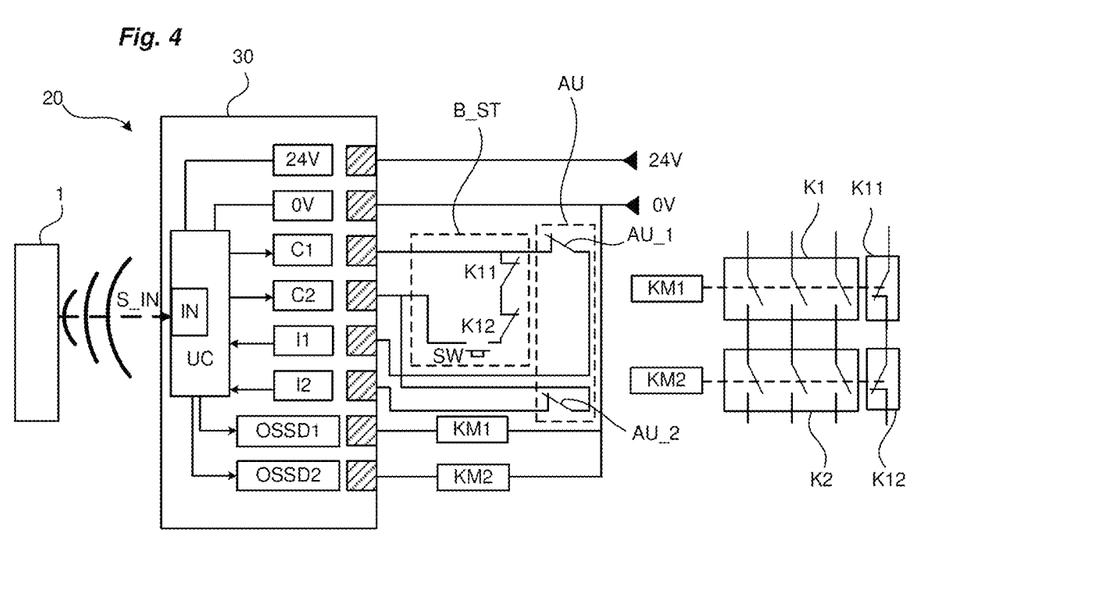
FIG. 4 shows the principle of wiring of the safety detection system of the invention.

FIG. 4 shows the wiring principle of the system comprising the emergency stop device AU with two redundant contacts, a safety detector 20 according to the invention and the start loop B_ST. According to this wiring principle, the two free terminals are used on a second control input I2 and a second control output C2 present in the detector 20. In FIG. 4, there are thus:
- The two supply terminals 0V, 24V which are connected to an external power source for applying a given voltage to it (here 24V);
- The two safety outputs OSSD1 and OSSD2 which are each connected via the two safety output terminals to a separate contactor (control coils KM1, KM2) of the machine to be controlled; the two contactors K1, K2 are associated in a redundant manner for the control of the machine;
- The start loop B_ST which is connected between the first control output C1 and the second control output C2;
- The first redundant contact AU_1 of the emergency stop device which is connected between the first control input I1 and the first control output C1 and the second redundant contact AU_2 of the emergency stop device which is connected between the second control input I2 and the second control output C2.

In this particular wiring configuration, a specific test software module is added to the other software modules described hereinabove, in the control and processing unit UC of the detector. This test module is designed to manage the addition of the emergency stop device AU, while at the same time conserving the monitoring of the start loop B_ST.

Figure 5A:
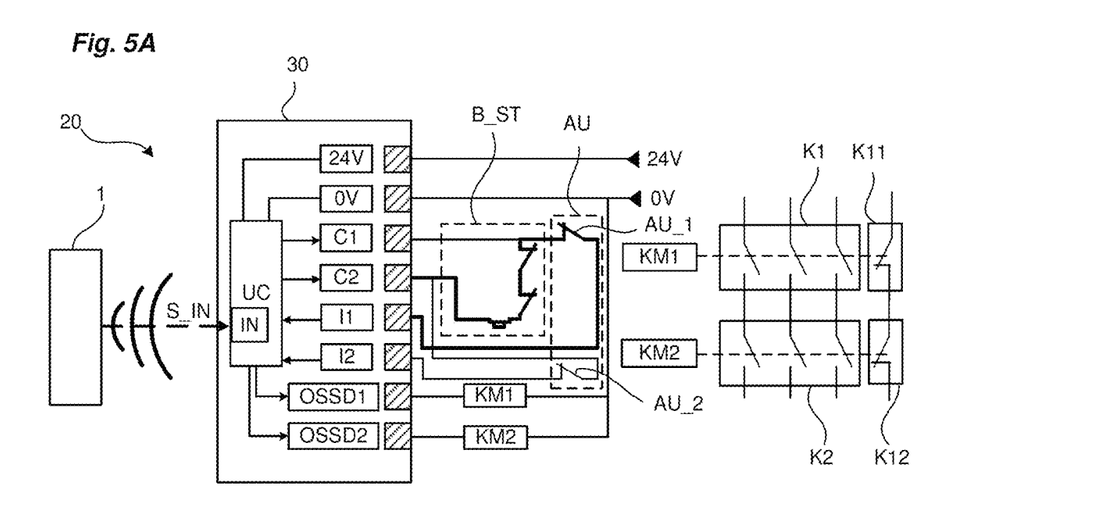
FIGS. 5A and 5B illustrate the principle of operation of the system of the invention.

Advantageously, this test module is advantageously run by the control and processing unit UC when the detector is in the START/RESTART mode. In this situation, with reference to FIGS. 5A and 5B, the following sequence of operations is executed by the test module:

FIG. 5A
- The test module disables the first control output C1, which then goes to the OFF state;
- The test module tests the status of the start loop B_ST by switching the second control output C2 to the ON state and while reading the status of the first control input I1 (paths indicated by darker lines in FIG. 5A);
- When the start push-button SW is pressed, the first control input I1 goes to the ON state, meaning that the start loop B_ST is closed but also that the first redundant contact AU_ is also closed.

Figure 5B:
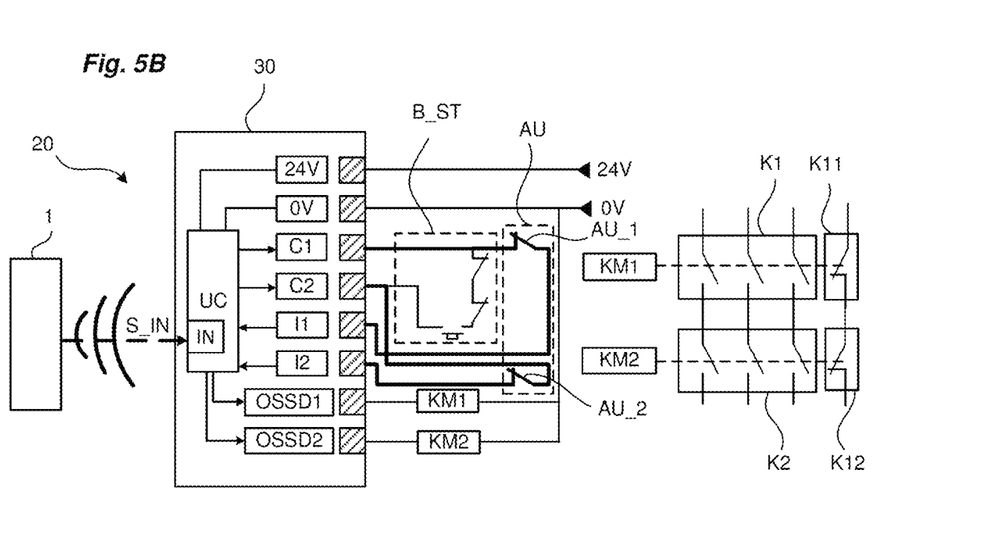

FIG. 5B
- The control and processing unit UC controls the switching of the detector into RUN mode;
- The two safety outputs OSSD1, OSSD2 are switched into the ON state and the first control output C1 is switched back into the ON state;
- The states of the two redundant contacts AU_1, AU_2 of the emergency stop device AU are monitored by the control and processing unit UC, respectively between the first control input I1 and the first control output C1 and between the second control input I2 and the second control output C2 of the sensor 30 (paths indicated by darker lines in FIG. 5B).

Figure 6:
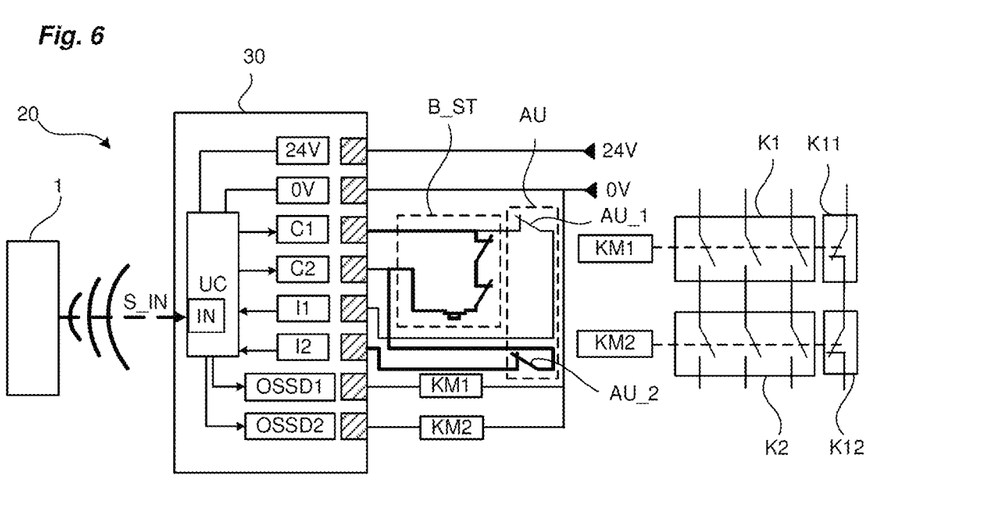
FIG. 6 illustrates the principle of a test alternative or complementary to that illustrated by FIG. 5A.

With reference to FIG. 6, as an alternative or as a complement to the sequence described in conjunction with FIG. 5A, the test module may also be configured for testing the start loop between the first control output C1 and the second control input I2. In this case, the second control output C2 is disabled prior to the test then re-enabled after the test.

It should be noted that a short-circuit test may also be implemented between the two control outputs C1, C2. For as long as the test is positive (short-circuit between the two outputs), the start is impossible.

As a complement, it is also possible to test the second redundant contact AU_2 by enabling the control output C2 and by monitoring the status of the second control input I2. If the path between C2 and I2 is closed, this means that the redundant contact AU_2 is indeed closed.

During the monitoring of the start loop, it is also possible to detect a possible short-circuit on the start button SW, once the latter has been released.

By the particular wiring configuration and the addition of a particular test module in the control and processing unit of the detector, it is possible to add the emergency stop functionality to the system while employing a detector which only comprises eight connection terminals.

The invention offers numerous advantages, amongst which are:
- A solution that is simple to implement for adding an emergency stop function in a safety detection system;
- A solution allowing the use of a safety logic block to be obviated, the function for management of the emergency stop being implemented by the detector;
- A solution which allows the system to remain within the initial size with only eight terminals of the detector.

The invention claimed is:
1. A safety detector comprising two supply terminals, a first control input and a first control output, a first safety output and a second safety output, a first free terminal and a second free terminal and a second control input connected to the first free terminal and a second control output connected to the second free terminal, the safety detector further comprising a control and processing unit configured for:
   reading a control signal at an input;
   applying a first test sequence comprising disabling the first control output and testing a start loop connected between the second control output and the first control input and/or a second test sequence comprising disabling the second control output and testing a start loop connected between the first control output and the second control input; and
   applying a third test sequence comprising reading a status of the first control output and a status of the second control output.

2. The safety detector according to claim 1, wherein the control and processing unit is configured for applying a fourth test sequence comprising enabling the second control output and reading a status of the second control input.

3. The safety detector according to claim 1, wherein the control and processing unit is configured for:
reading a status of each control input;
determining an operational state taking into account the status of the control inputs of the safety detector; and
controlling the safety outputs of the safety detector and the control outputs of the safety detector, according to the determined operational state.

4. The safety detector according to claim 1, wherein the safety detector is of the contactless type and wherein the safety detector comprises:
a sensor and a transponder paired to said sensor,
the control signal being modified when said transponder is present in a detection area of the sensor.

5. The safety detector according to claim 1, wherein the safety detector is of a light barrier type and wherein the control signal is modified by passing through a light barrier.

6. The safety detector according to claim 1, wherein the safety detector is of an actuation by cable type and wherein the control signal is modified by traction of a cable.

7. A safety detection system, comprising:
a safety detector comprising two supply terminals, a first control input and a first control output, a first safety output and a second safety output, a first free terminal and a second free terminal, and a second control input connected to the first free terminal and a second control output connected to the second free terminal, the safety detector further comprising a control and processing unit configured for:
reading a control signal at an input; and
applying a first test sequence comprising disabling the first control output and testing a start loop connected between the second control output and the first control input and/or a second test sequence comprising disabling the second control output and testing a start loop connected between the first control output and the second control input,
the safety detection system further comprising an emergency stop device with two redundant contacts and a start loop wherein:
the start loop of the safety detection system is connected between the first control output and the second control output of the safety detector; and
a first redundant contact of the emergency stop device is connected between the first control input and the first control output and the second redundant contact of the emergency stop device is connected between the second control input and the second control output.

8. The system according to claim 7, wherein the start loop of the safety detection system comprises a start push-button.

9. The system according to claim 8, wherein the start loop of the safety detection system comprises two normally-closed contacts of two control contactors of an installation to be controlled.

10. A control method implemented in the safety detector of the safety detection system according to claim 7, the control method comprising:
applying the first test sequence,
wherein testing the start loop when applying the first test sequence comprises testing a status of the start loop by enabling the second control output and by reading a status of the first control input of the detector;
and/or applying the second test sequence,
wherein testing the start loop when applying the second test sequence comprises testing a status of the start loop by enabling the first control output and by reading a status of the second control input of the detector.

11. The method according to claim 10, wherein the testing is implemented several times for as long as the first control input has not been enabled during said first test sequence and/or for as long as the second control input has not been enabled during the second test sequence.

12. The method according to claim 10, further comprising starting by enabling safety outputs and re-enabling the first control output for the first test sequence.

13. The method according to claim 12, further comprising, after said starting, monitoring the first redundant contact of the emergency stop device between the first control input and the first control output and monitoring the second redundant contact of the emergency stop device between the second control input and the second control output.

14. The method according to claim 10, further comprising starting by enabling safety outputs and re-enabling the second control output for the second test sequence.

15. A method of using the safety detection system according to claim 9, the method comprising monitoring a start of an electrical installation protected by a device comprising a fixed part onto which a sensor of the safety detector is fixed and a mobile part onto which a transponder of the safety detector is fixed.

16. A safety detector comprising two supply terminals, a first control input and a first control output, a first safety output and a second safety output, a first free terminal and a second free terminal, and a second control input connected to the first free terminal and a second control output connected to the second free terminal, the safety detector further comprising a control and processing unit configured for:
reading a control signal at an input;
applying a first test sequence comprising disabling the first control output and testing a start loop connected between the second control output and the first control input and/or a second test sequence comprising disabling the second control output and testing a start loop connected between the first control output and the second control input;
reading a status of each control input;
determining an operational state taking into account the status of the control inputs of the safety detector; and
controlling the safety outputs of the safety detector and the control outputs of the safety detector, according to the determined operational state.

17. A safety detection system, comprising:
a safety detector according to claim 16, an emergency stop device with two redundant contacts and a start loop wherein:
the start loop of the safety detection system is connected between the first control output and the second control output of the safety detector; and
a first redundant contact of the emergency stop device is connected between the first control input and the first control output and the second redundant contact of the emergency stop device is connected between the second control input and the second control output.

18. A control method implemented in the safety detector of the safety detection system according to claim 17, the control method comprising:
applying the first test sequence, wherein testing the start loop when applying the first test sequence comprises testing a status of the start loop by enabling the second control output and by reading a status of the first control input of the detector; and/or applying the second test sequence, wherein testing the start loop when applying the second test sequence comprises testing a status of the start loop by enabling the first control output and by reading a status of the second control input of the detector.

\* \* \* \* \*